March 27, 1934. C. E. ARMSTRONG 1,952,350
AUTOMATIC CONTROL FOR HEATING AND VENTILATING
Filed June 13, 1931 4 Sheets-Sheet 1
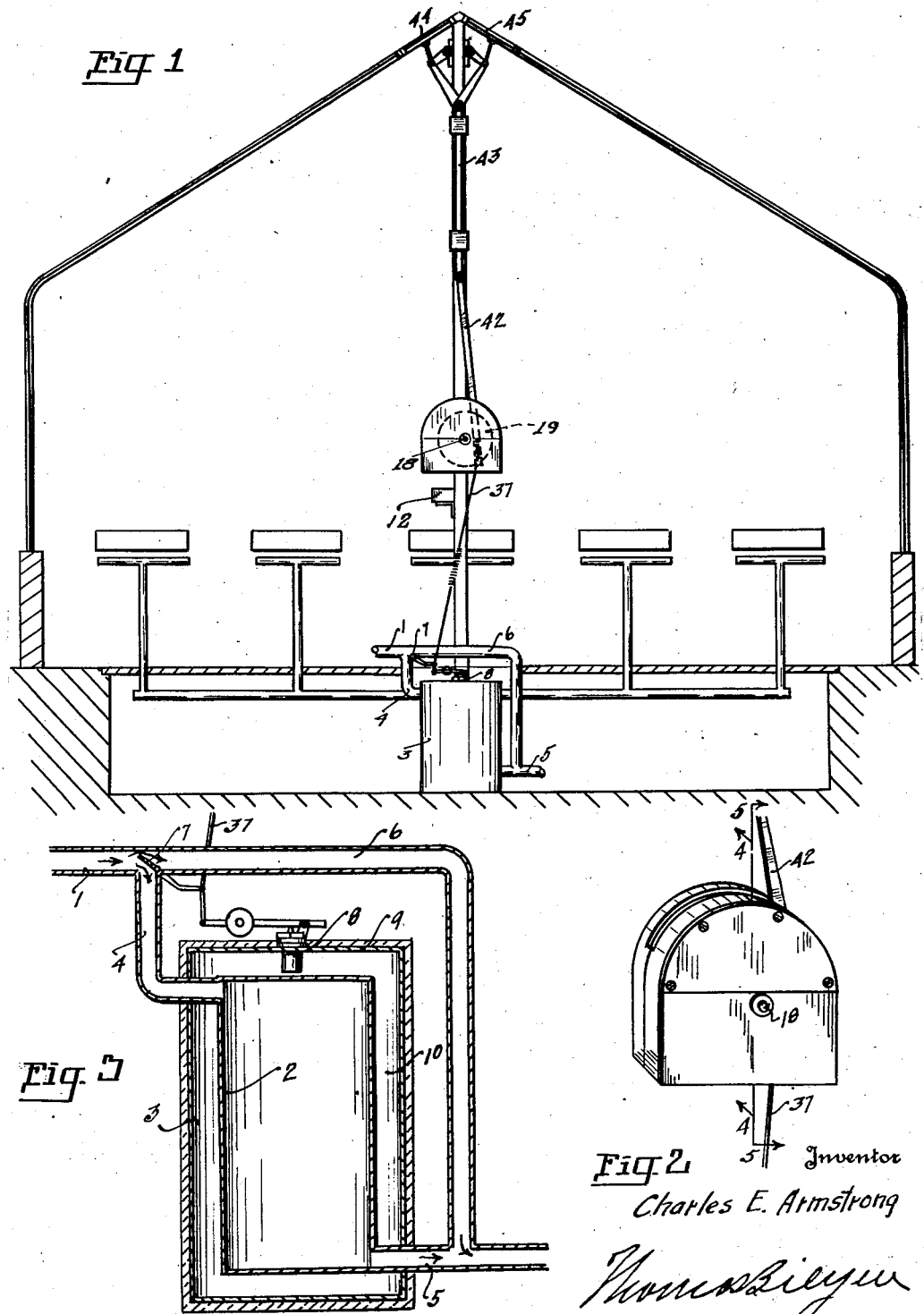
Inventor
Charles E. Armstrong

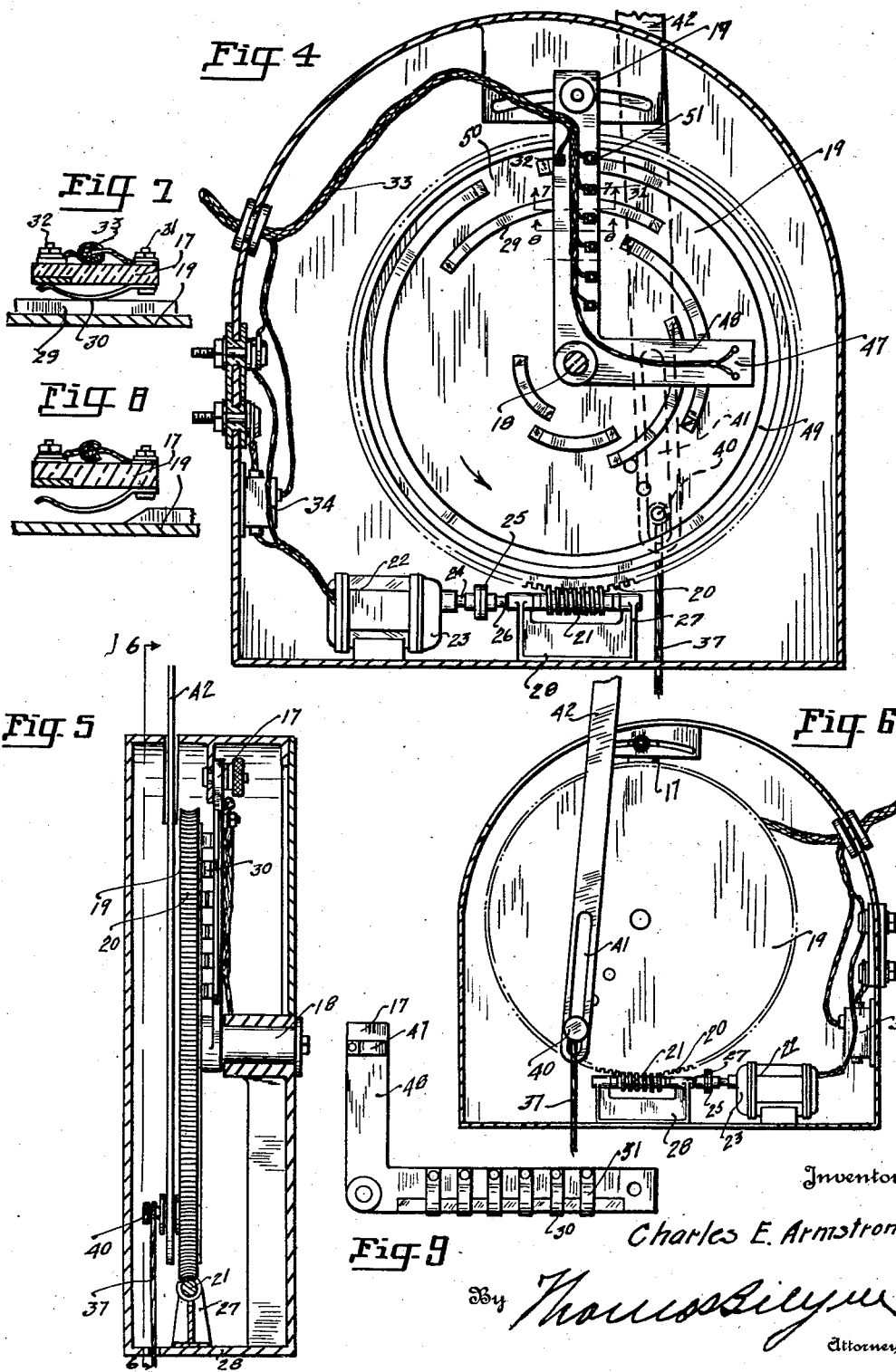

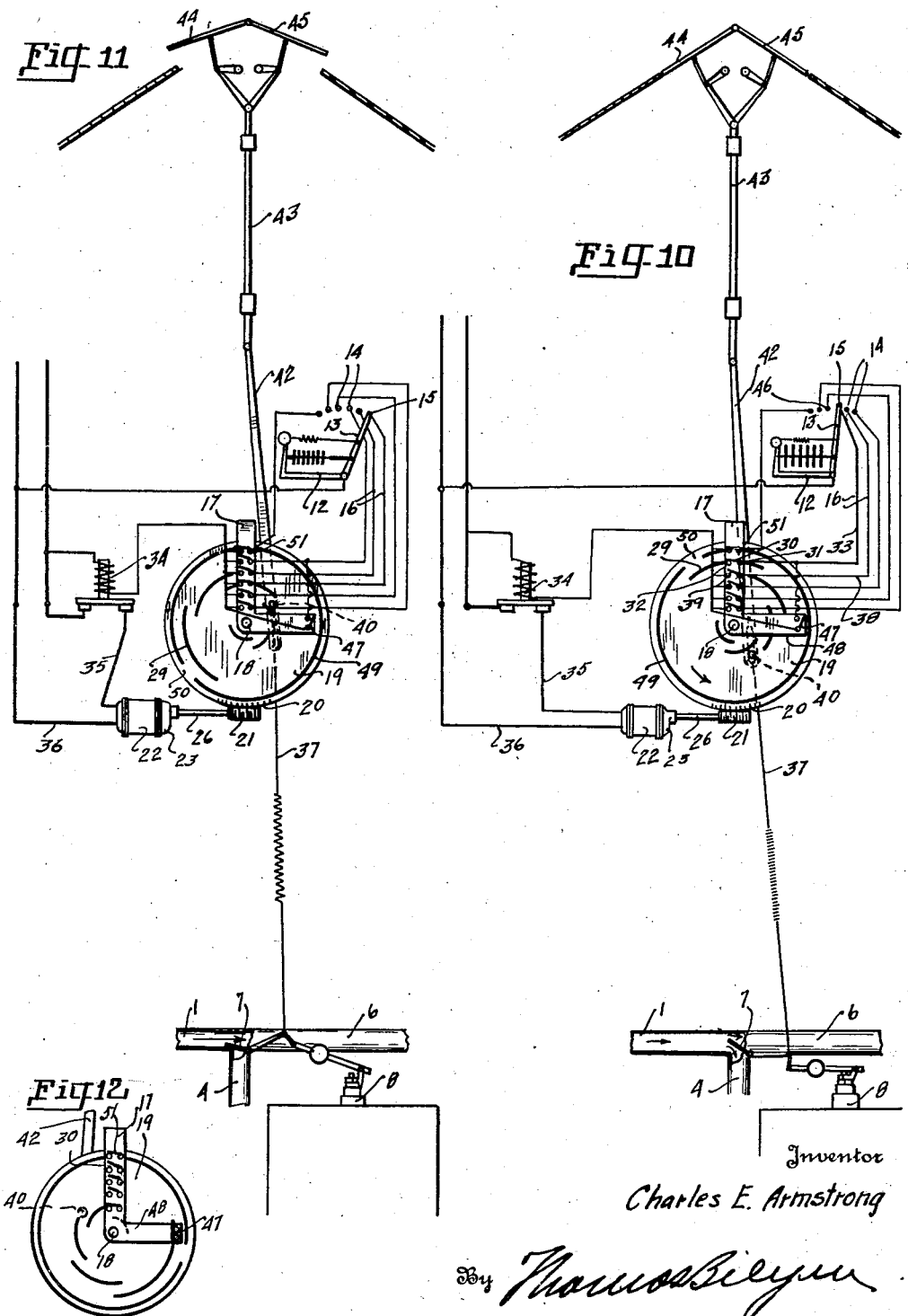

March 27, 1934.   C. E. ARMSTRONG   1,952,350
AUTOMATIC CONTROL FOR HEATING AND VENTILATING
Filed June 13, 1931    4 Sheets-Sheet 4
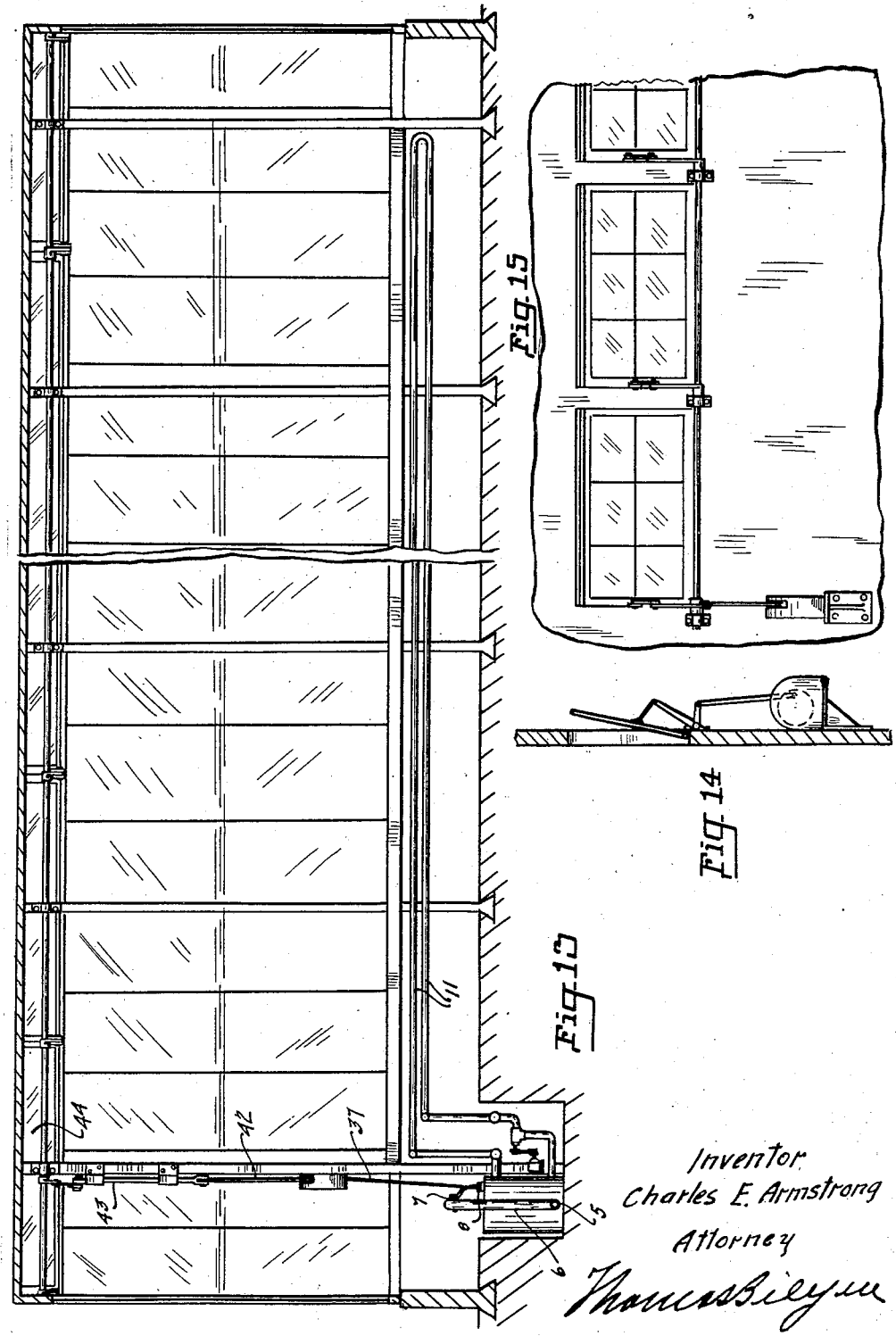
Inventor
Charles E. Armstrong
Attorney Patented Mar. 27, 1934

1,952,350

UNITED STATES PATENT OFFICE 1,952,350

AUTOMATIC CONTROL FOR HEATING AND VENTILATING

Charles E. Armstrong, Corvallis, Oreg., assignor to Armstrong Heat Control Co., a corporation of Oregon Application June 13, 1931, Serial No. 544,263

4 Claims. (Cl. 236—76)

My device is primarily intended for use as an automatic device for the regulating of temperature and draft in green houses, but the same may be used with equal facility, and for like, or similar purposes in manufacturing plants, in dry kilns, and in any and all places where one, or more companion devices are to be actuated by a thermostat as the controlling factor and wherein temperature is the motivating force that starts each cycle of operation due to a rise or fall in temperature.

In this description I have shown and described a thermostat as the controlling factor actuated by a rise, or fall in temperature. The movement of the thermostat arm completes an electric circuit that energizes an electric prime mover. At each energization of the prime mover, valves are manipulated for the controlling of the flow of a heated fluid through a heat transfer, and for the regulating of the ventilators in the green house.

The device may be used for the actuating of controls, one or more in number that may be used for the regulating of humidity, or draft, or for actuating ventilators for the controlling of ejectors, or for any other purpose.

One of the objects of my invention is to predetermine the amount of heat that may be supplied within the green house.

A further object of my invention consists in regulating the maximum amount of heat that may be developed within the green house.

A further object of my invention consists in regulating the amount of heat that may be supplied to the heat interchanger.

A further object of my invention consists in placing a regulating device within the heat interchanger that regulates and determines the maximum temperature that may be developed within the heat interchanger, irrespective of the action of the thermostat control.

A further object of my invention consists in not only regulating the amount of heat that may be supplied within the green house, but in also regulating the amount of heat that may be retained within the green house. The heat within the green house is determined by opening, or closing the ventilators, when a predetermined temperature is developed within the green house.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a diagrammatical layout of a green house in which is illustrated a heat supply pipe, a heat interchanger, a heat regulator disposed within the head of the heat interchanger, the object of which is to predetermine the total amount of heat that may be developed within the heat interchanger, and a thermostat, an electrically driven control for partially shutting off, and for totally shutting off, the heat flow from the heat supply pipe to the heat interchanger, and for opening and for closing the ventilators.

Fig. 2 is a perspective side view of a container, in which is disposed an electric power driven control mechanism.

Fig. 3 is a sectional side view of a heat interchanger and the heat supply pipe associated therewith, illustrating a valve and a heat control mechanism for regulating the amount of heated fluid to be supplied to the heat interchanger and for predetermining the temperature that may be developed within the heat interchanger.

Fig. 4 is a sectional, side view, of the contact mechanism disposed within the container as illustrated in Fig. 2, the same being taken on line 4—4 of Fig. 2, looking in the direction indicated.

Fig. 5 is a sectional end view of the mechanism illustrated in Fig. 4, and in Fig. 2, the same being taken on line 5—5 of Fig. 2, looking in the direction indicated.

Fig. 6 is a sectional side view of the mechanism illustrated in Figs. 2, 4 and 5, the same being taken on line 6—6 of Fig. 5, looking in the direction indicated.

Fig. 7 is a sectional end view of the bell crank arm upon which a plurality of spaced switch points are disposed, the same being taken on line 7—7 of Fig. 4, looking in the direction indicated. In this position the switch is shown closed to pass the electric current therethrough, due to an energization caused through the action of the thermostat control which may be caused by a rise, or fall, in temperature above, or below critical points.

Fig. 8 is a sectional, end view of one of the switches disposed upon the bell crank arm, in open position, the same being taken on line 8—8 of Fig. 4, looking in the direction indicated.

Fig. 9 is a detached, inverted plan view of the bell crank arm upon which the switches are mounted, the same being made to illustrate the switches. The contact bars of the switch, here shown as 7 in number, 6 of which are disposed upon the primary arm of the bell crank and one of which is disposed upon the secondary arm of the bell crank, all switch points, preferably, being disposed upon the same side of the bell crank.

Fig. 10 is a diagrammatical layout of the wiring assembly shown with the thermostat having actuated the device into first contact position with a part of the heat flowing through the heat interchanger and with the ventilators closed.

Fig. 11 is a diagrammatical layout of the assembly and of the wiring diagram illustrating the contact as being in third position, in which position all heat flowing through the heat interchanger is shut off and the ventilators are open.

Fig. 12 is a diagrammatical layout of the bell crank assembly and of the switches and circuits associated therewith illustrating the switch disposed upon the secondary arm of the bell crank in position to complete the circuit and prevent a stall of the mechanism when a reverse movement in the progression becomes necessary, due to a change in temperature in the reverse direction.

Fig. 13 is a sectional side view of the green house mechanism and the associated elements.

Fig. 14 is a partial sectional view of a wall, window, and thermostat, the window being shown controlled by the thermostat through a system of levers and shafts.

Fig. 15 is a front view of a number of windows designed to be controlled by one thermostat of the type shown in Fig. 14, showing the thermostat controlling the windows thru a common shaft connected to each window by an arm rigidly attached to the shaft and a pin pivotally connected between the arm and the window.

Like reference characters refer to like parts throughout the several views.

In the drawings I have here shown a heat supplying pipe 1 that leads to a source of heat supply, as a boiler not here shown. A heat interchanger 2 as shown in Fig. 3 is disposed within and in spaced relationship with the jacket 3, the heat normally flowing through a supply pipe 4 through the heat interchanger 2 and outward therefrom, through the pipe 5. A by-pass 6 is disposed around the heat interchanger through which the heated fluid may be made to pass due to the position of the valve 7, which is adapted for forcing all, or a part of the heated fluid through the by-pass, depending upon the position of the same. A heat regulating thermostat 8 is disposed within the wall 9 of the jacket, the purpose and object of which is to regulate automatically the temperature within the space disposed between the jacket and the heat interchanger. The circuit thus described is the primary circuit.

A secondary circuit is provided for circulating a fluid about the heat interchanger around the space 10 disposed within the heat interchanger within jacket 3.

The fluid may be thus heated by contact with the heat interchanger and then passed through the radiating pipes 11 which are disposed about the green house the temperature of which is controlled by the thermostat.

Referring to Figs. 1, 10 and 11 a thermostat 12 is disposed at any convenient location within the room, the temperature of which is to be automatically regulated. A contact arm 13 is adapted to be manipulated through the action of the thermostat. A progression of electric terminal points 14, here shown as six in number, are disposed in registerable alignment with the contact point 15 of the arm 13, the points 14 being in spaced relationship with each other and being adapted for being contacted by the point 15 disposed upon the arm 13. Electric circuits 16 lead from the points 14 to a switch disposed upon a bell crank 17. The bell crank 17 is fixedly positioned upon a supporting shaft 18. A power driven disc 19 is journaled about the shaft 18, and gear teeth 20 are disposed upon the outer periphery of the disc 19. A worm 21 coacts with the worm wheel and is adapted for driving the disc in the direction indicated by the arrow in Fig. 4.

A prime mover, as an electric motor 22, has a gear reduction 23 associated therewith and a shaft 24 is adapted for being driven by the shaft of the gear reduction. A flexible coupling 25 is disposed upon the shaft and between the shaft 24 and the shaft 26, upon which the worm is mounted. The worm is journaled within suitable brackets 27 that are superposed upon a base 28.

A plurality of insulating cams, which are disposed in spaced relationship with each other outwardly extend from one side of the disc 19. These switches are adapted for being placed in registry with each of these cams. The cams are adapted to be made to contact therewith and to close an electric circuit while in contact. I have here shown six of these insulated cams and I shall describe the movement that is created by each of these. Referring to Fig. 4 the cam 29 is placed in registry with the switch point 30 and when the cam contacts with the switch point 30 electric current flows through the terminals 31 and 32 and through the conductor 33, and through the magnetic switch 34. The closing of the switch 34 passes the current through the conductor 35, the prime mover 22 and the conductor 36. The current passes through the prime mover until the disc 19 with cam 29 has passed out of registry with the switch point 30. At the energization of the prime mover as thus described, the disc is turned for the space of the contacting cam. The first movement and the partial rotation of the disc 19 exerts a pull upon the chain or cord 37 to place the valve 7 in the position as illustrated in Fig. 3.

In the position as shown but a part of the heated fluid passes through the heat interchanger 2 and the remainder of the heated fluid is by-passed through the by-pass 6. A further rise in temperature within the green house passes the thermostat arm 13 into the position where the point 15 of the arm contacts with the next terminal 14. When this contact is completed electric energy flows through the electric conductor 38 through switch 39, and through the switch 34 and through the prime mover 22. When this is done a further pull is exerted upon the cord, or chain 37 and the valve 7 is completely closed to thereby by-pass all of the heated fluid through the by-pass valve 6. This prevents the passage of any of the heated fluid passing through the heat interchanger 1 and the radiator coils 11. During the movement of the disc 19 thus far described a wrist pin 40 has been moved within a slot 41 as illustrated in Fig. 6 of the arm 42. The purpose and object of the arm 42 is to impart a longitudinal movement to the link 43. A further rotation of the disc 19 in the direction thus far described through mechanism similar to that herein described raises the link 43 and raises and opens the ventilators 44 and 45 disposed at the apex of the roof of the green house as shown in Fig. 11.

Upon a drop in temperature, the arm 13 will be retracted, and contact point 15 will connect with successive points 14. There is an overlap in the cams such that some one of the contact fingers on support 17 is always in contact with a cam. It will be noted that cross-connections are provided between the switch blades 30, 39, etc., such that when the contact point 15 is withdrawn from its farthest out position by contraction of the gas wafers, the circuit leading to relay 34 will be closed through whichever of the cams happens to be in proper position, and the motor 22 will cause the disc 50 to revolve until the windows 44 and 45 are closed thru the action of wrist pin 40 on arm 42 and link 43.

The switch support 17 is made in the form of a bell crank, having a secondary arm 48 disposed at right angles to the primary arm.

A contact 47 is disposed upon arm 17, and is adapted to be actuated by cam 29. This cam is so positioned upon disc 50 that it engages contact 47 and completes the circuit therethrough to actuate the prime mover 22 and rotate the disc back to the initial position after successive temperature drops have rotated the disc so that the inmost cam has been passed. Beyond this point the device could not operate on a rise were not the cam 29 available to close the circuit.

Cam 49 is provided to care for cases in which a temperature drop from the hottest position should be so sudden that contact arm 15 does not stop long enough on the successive contacts 14 to cause the mechanism to operate. When this is so, and the contact arm is pulled to the coldest position, thru the action of cam 49 the motor is operated until the disc has rotated to the initial position and the windows are closed.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a rotatably mounted disc, a worm gear formed around the peripheral edge of the disc, a coacting worm operatively engaged with the worm gear and adapted to impart rotation thereto, a prime mover operatively engaged with said worm, a plurality of spaced insulating cams formed on one face of the disc, a bell crank arm arranged in spaced relation to the disc and provided on its inner side with a plurality of switch points adapted to be closed by the passage of the cams thereagainst, said prime mover and switch points embraced within an electric circuit, a thermostat embraced within said circuit and adapted to close the same at predetermined degrees of temperature and to cause rotation of the prime mover and a resultant movement of the disc until one of said cams has become disengaged with one of said switch points.

2. In a device of the class described, the combination of a disc, a plurality of insulated cams disposed upon one face of the disc and outwardly extending therefrom, an arm carrying a like number of switch points that are adapted for being placed in registry with the insulated cams and for being closed when contacting the cams and automatic means for passing an electric current through the switch and through a prime mover when predetermined temperatures are reached, and for rotating the disc for the distance that the cam contacts the switch point at each energization of the prime mover.

3. In a device of the class described, the combination of a disc, a worm gear formed around the periphery of the disc, a worm driven by an electric motor and coacting with the worm gear, a plurality of insulated cams disposed upon the face of the disc and extending outwardly therefrom, an arm in spaced relation to the disc and provided with a plurality of switch points adapted to be placed in the path of movement of said cams and to be closed when contacted by said cams, said electric motor and switch points embraced within an electric circuit, a thermostat embraced within said circuit and adapted to energize said switches and motor when predetermined temperatures are reached to rotate the disc for the distance that the cam contacts the switch point at each energization of the electric motor.

4. A thermostatic control device, comprising a plurality of gas-filled metallic wafers, a lever having an electric contact thereon, adapted to be actuated by the expansion or contraction of the wafers, electrical contacts adapted to engage that carried by the lever, a prime mover adapted to be operated through closure of said electric contacts, a disc, means whereby said disc may be rotated by the prime mover: a bell-crank member fixed adjacent the disc, switches thereon, and embraced within the circuit embracing said electrical contacts and said prime mover, cams extending outwardly from the flat sides of the disc adapted to close such switches; said cams being so spaced about the disc that means are available to rotate the disc under all conditions of temperature rise and fall.

CHARLES E. ARMSTRONG.